3,343,999
METHOD FOR THE MANUFACTURE OF VACUUM CONTAINERS
Lucien Petermann, Onex, Switzerland, assignor to Commissariat à l'Energie Atomique, Paris, France
No Drawing. Filed May 10, 1965, Ser. No. 459,978
Claims priority, application France, May 12, 1964, 974,212
4 Claims. (Cl. 148—16.5)

ABSTRACT OF THE DISCLOSURE

Elements for forming the walls of a vessel for use as a vacuum container are coated with a stable uniform layer of an oxide, carbide, nitride or hydride to prevent removal of residual gases from the walls. The elements may be stainless steel coated with an oxide by an oxidizing gas at predetermined pressures and temperatures for suitable lengths of time.

---

This invention relates to a method for the manufacture of vacuum containers, especially steel-walled containers, which makes it possible to overcome to a very large extent the disadvantages which are usually attached to the removal of residual gas from the walls of such containers.

Under these conditions, the object of the invention is to permit the possibility of creating very high vacua in containers of large size by means of relatively small pumps without thereby entailing the need to subject these containers to prolonged stoving at high temperature.

It is known that, in order to obtain within a closed vessel at room temperature an ultimate vacuum of the order of $10^{-10}$ torr, it is necessary to subject said vessel to a preliminary stoving or moderate heating in an oven for a period of approximately 10 hours at a temperature in the vicinity of 400 to 450° C., steps being additionally taken to ensure that no organic substance is employed in the construction of the different components of said vessel.

By means of the stoving process referred-to, the rate of residual desorption is reduced to a sufficiently low value to permit the production of very low pressures by means of pumps of small sizes. However, in order to obtain an ultimate pressure of $10^{-10}$ torr within a container or vessel having a volume of the order of 10 m.$^3$, it is considered that the specific flux of residual desorption must not exceed $10^{-13}$ torr/l/sec./cm.$^2$, which is possible as a rule only after stoving of the entire vessel over an extremely long period. This gives rise to a large number of disadvantages which are due in particular to the need to employ a heating unit of substantial size, to the difficulty involved in obtaining a uniform temperature within a container which is also of substantial size, to the difficulties which increase with the stoving temperature and with the dimensions of said container, and to a limitation in the choice of materials employed according to their particular characteristics in regard to melting, re-crystallization, creep, etc. In addition, it is difficult to overcome the disadvantages which arise from the use of vacuum-tight seals which are capable of withstanding the necessary thermal cycles as well as from the expansions of the different component parts of the container.

The present invention has for its object a method for the manufacture of vacuum containers which has the advantage among others of permitting the production of residual pressures of the order of $10^{-10}$ torr within large containers without the need for stoving or after stoving at a moderate temperature of 200 to 300° C. for a short period of the order of only a few hours. Moreover, this method makes it possible to produce residual pressures which are appreciably lower than $10^{-10}$ torr after conventional stoving over a period of the order of 10 to 20 hours at 450° C.

To this end, the method which is contemplated is characterized in that it consists in carrying out successively the machining and shaping of the container walls followed by a cleaning operation, a polishing operation carried out either by electrolytic process, chemical process or mechanical process and a rinsing operation, then a surface treatment of said walls by chemical action of a substance which reacts with the metal of the walls and finally the assembly of said walls.

It is in fact known that the flow of residual gas which is evolved from the walls of a vessel limits the vacuum which can be generated within this latter and is essentially derived from two separate sources constituted on the one hand by the absorbed gas which is attached to the surface of the walls and, on the other hand, by the dissolved or occluded gas contained in the interior of the solid material which constitutes the vessel walls. In order to remove the surface gas, it is merely necessary to heat the vessel walls to approximately 200° C. while carrying out a continuous pumping operation, followed by cooling. However, the removal of the gas contained within the solid material is more difficult to carry into practice, especially in the case of industrial alloys.

One method which is applicable to small samples consists in heating these latter to a very high temperature in a vacuum; the gases diffuse through the solid and leave its surface where they are not liable to become attached. However, this method is prohibitive in the case of large parts and cannot in any case be effectively applied to metals and alloys which evaporate readily under a vacuum and which are liable to creep at these temperatures. For example, a tungsten part can be degassed in vacuo by heating to approximately 2000° C. without producing a high degree of evaporation. On the other hand, above 900° C., chromium and nickel evaporate rapidly from a stainless steel part whereas, at this temperature, many hours of treatment would be necessary to remove the gases contained in a part having a thickness of a few millimeters.

The method according to the invention accordingly makes it possible to overcome the disadvantages referred-to above by making provision for a durable surface barrier over the surface of the walls, the object of said barrier being to prevent the gases from escaping from the solid.

As a preferred feature, the surface treatment consists in an oxidation of the walls as produced by heating under a suitable pressure and temperature for a predetermined period of time either in ambient air or in pure oxygen, or alternatively in a mixture of gases which is capable of producing surface oxidation.

It should be noted in addition that the preparation of the state of surface of the walls by cleaning, polishing and rinsing does not have to result in an optically smooth surface as an essential condition but must be merely sufficient to leave said walls free of all contamination except for small quantities of oxide and surface water which are usually inevitable. Moreover, and in the case which is more especially considered in which the walls of the vessel or container are of steel, the heating during the oxidation phase ranges between 430 and 550° C. at atmospheric pressure, the duration of said heating process being variable between a few minutes and a few hours. By way of example, heating over a period of two hours at approximately 450° C. in air makes it possible to form a surface layer of oxide of the order of 1000 A. in thickness on a stainless steel part of the type "NS-22S" which is polished by electrolytic process.

The advantages of a surface barrier of this type are numerous. Particular emphasis should be laid on the advantage which is brought about by the substantial reduction in the rate of specific desorption, which no longer depends in this case on the thickness of the subjacent solid wall. Moreover, such a barrier can be very easily obtained by means of simple oxidation treatments which can be applied without any special difficulty to large parts irrespective of the shape and size of these latter. Finally, the action of the oxide layer is durable, the occluded gases within the walls do not produce action on the barrier which is thus formed: even after exposure to the surrounding air for a period of the order of 30 days, a steel sample which is covered with a surface layer retains its factor of improvement from the point of view of residual desorption with respect to the same untreated steel. Furthermore, it should be noted that an oxidized surface retains in a general manner much less absorbed gas than a clean surface, which also constitutes a further advantage.

By way of explanatory illustration, there will now be given hereunder two particular examples of treatment of steel surfaces as contemplated by the method according to the invention.

*Example 1*

In the case of a stainless steel of the type 18-8, NS-22S, it is merely necessary to heat in an oven for a period of the order of 1 hour at 300° C. with a pumping speed of the order of 0.2 l./s. in respect of a wall area of 800 cm.$^2$ in order to attain a specific residual desorption flux of the order of $4 \times 10^{-14}$ torr l./s. cm.$^2$ with a vessel of steel which is oxidized in ambient air for a period of two hours at 500° C. This flux would be equal to 1.5 $10^{-11}$ torr l./s. cm.$^2$ only in the case of a similar vessel which has not been oxidized.

*Example 2*

In the case of a vessel of titanium stainless steel of the grade DIN x 10 Cr NiTi 189 and specifically a sample having the shape of a hollow cylinder and a thickness of wall of 1 mm., a length of 12 mm. and an external diameter of 20.5 mm., a lathe-turning operation is first carried out followed by a degreasing and electrolytic polishing with a 60% solution of concentrated $H_3PO_4$ and a 40% solution of concentrated $H_2SO_4$ at a temperature of 45° C. and a current intensity of 1 amp./cm.$^2$ for a period of 5 to 10 minutes.

After rinsing with de-ionized water, there is then carried out an oxidation by heating in ambient air at 540° C. for two and one half hours. The treatment is completed by heating in an oven for a period of 5 hours at 300° C. in a very-high-vacuum rack.

The specific residual desorption flux of steel thus treated, as measured in the course of a number of tests, is of the order of $10^{-14}$ torr l./s. cm.$^2$ at room temperature. On the other hand, an identical steel sample which does not have any surface oxide layer but which has otherwise been subjected to exactly the same treatments exhibits a specific flux of residual gas and especially of occluded hydrogen of $2 \times 10^{-11}$ torr l./s. cm.$^2$ at room temperature.

The gain thus achieved is therefore multiplied by a factor of approximately 2,000 in favor of oxidized steel.

As will be readily understood, the invention is not limited in any sense to the examples which have been more especially considered in the foregoing. In particular, the action of the desorption barriers is not necessarily limited to oxide layers or to stainless steels, and a sufficiently stable surface layer of substantial and uniform thickness of a nitride, carbide or hydride at the surface of a given metal also constitutes an effective barrier for certain gases under particular conditions of utilization.

What I claim is:

1. Method for the manufacture of vacuum containers in which the container walls are machined, cleaned, polished and then rinsed, the steps of surface coating said walls with a stable surface layer of substantially uniform thickness selected from the group consisting of oxides, nitrides, carbides and hydrides by chemical action of a substance which reacts with the metal of the walls and then assembling said walls.

2. Method for the manufacture of vacuum containers as described in claim 1, said walls being stainless steel and said surface coating consisting of a surface oxidation of said walls by heating said walls under pressure and temperature for a predetermined time in an oxidizing gas.

3. Method for the manufacture of vacuum containers as described in claim 2, said surface oxidation temperature ranging from 430 to 550° C. at atmospheric pressure, said predetermined time being between a few minutes and a few hours.

4. Method for the manufacture of vacuum containers as described in claim 2 including after surface oxidation of said walls the step of heating said walls in an oven.

References Cited

FOREIGN PATENTS 1,144,968   4/1957   France.

OTHER REFERENCES

Transactions of The Eighth Vacuum Symposium and Second International Congress, A.V.S., 1962, pages 73–77.

Ultrahigh Vacuum and Its Applications, Roberts et al., 1963, pages 84, 93, 94, 109–119.

DAVID L. RECK, *Primary Examiner.*

HYLAND BIZOT, *Examiner.*

H. F. SAITO, *Assistant Examiner.*